Sept. 23, 1952      H. L. FITCH      2,611,300
FILM HANGER
Filed Dec. 29, 1949      3 Sheets-Sheet 1
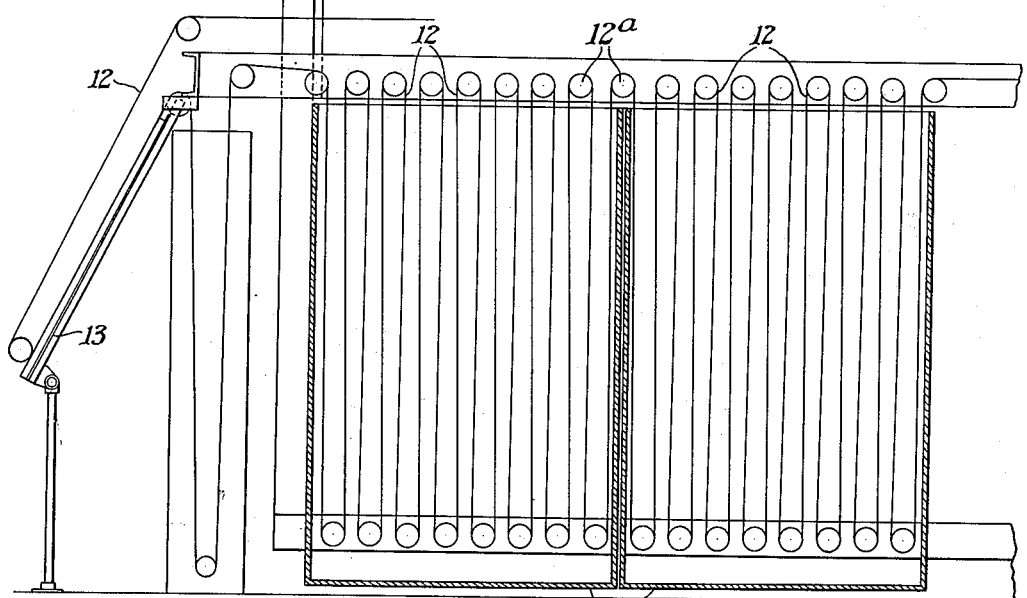
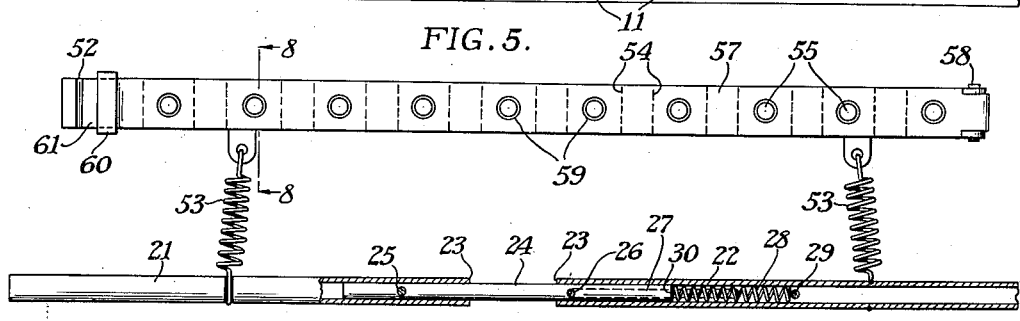
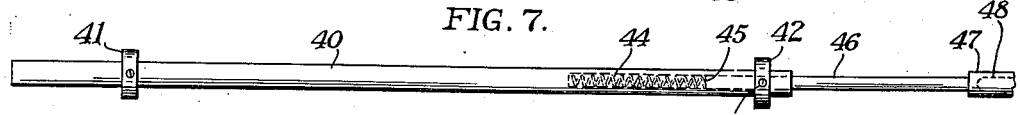
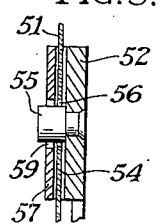
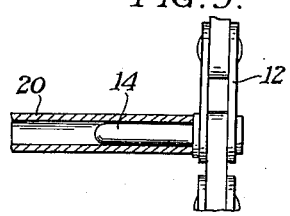
HAROLD L. FITCH
INVENTOR
Daniel T. Mayne
BY J. Griffin Little
ATTORNEYS Sept. 23, 1952     H. L. FITCH     2,611,300
FILM HANGER Filed Dec. 29, 1949     3 Sheets-Sheet 2

HAROLD L. FITCH
INVENTOR
Daniel J. Mayne
BY J. Griffin Little
ATTORNEYS

Sept. 23, 1952 H. L. FITCH 2,611,300
FILM HANGER
Filed Dec. 29, 1949 3 Sheets-Sheet 3
FIG. 3.
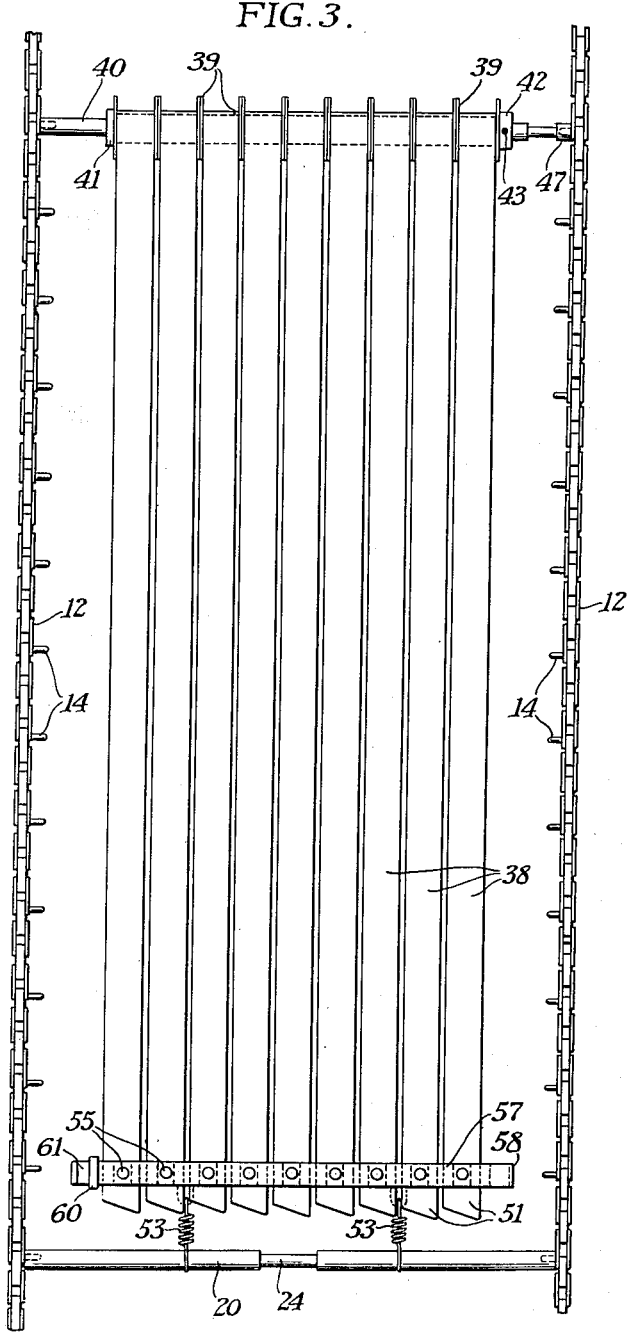
FIG. 4
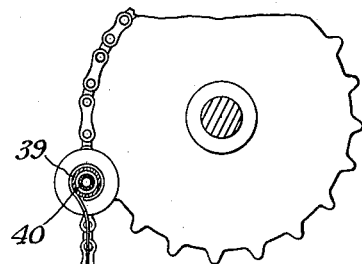
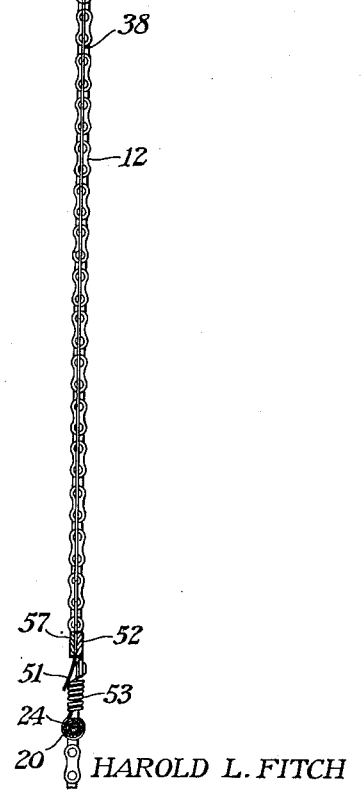
HAROLD L. FITCH
INVENTOR
BY
ATTORNEYS Patented Sept. 23, 1952

2,611,300

UNITED STATES PATENT OFFICE 2,611,300

FILM HANGER

Harold L. Fitch, Rochester, N. Y., assignor to Eastman Kodak Company, Rochester, N. Y., a corporation of New Jersey Application December 29, 1949, Serial No. 135,626

5 Claims. (Cl. 95—94)

The present invention refers to photography, and more particularly to film hangers for use in connection with endless chains or members for moving the hangers progressively through tanks of treating solutions.

As has long been common practice, where large quantities of films are developed or processed, the films are passed successively through the various processing baths or solutions which may be positioned in separate containers or tanks. In order to make the machine automatic, or semi-automatic, chains, belts or similar endless members are arranged to pass through the various tanks which are arranged in aligned relation and open at their tops. The result is that all an operator has to do is connect the films or the film hangers to the endless members ahead of the first tank, and then remove the processed film from the endless members beyond the last tank. The particular form of tanks and guide means for the endless members in the tanks may be of any suitable or standard construction and does not form a part of the present invention.

In the preferred embodiment of the invention a pair of movable, endless, parallel chains are arranged at opposite sides of the apparatus and are utilized to move the film hangers, to be later described, successively through the solutions in the various tanks. In order that the hangers may be connected detachably to the pair of chains, the latter are provided with a plurality of aligned inwardly-extending pins arranged along the chains, as shown in the drawings and to be later more fully described.

In general, each film hanger is provided with a pair of spaced axially-adjustable members or rods connected to opposite ends of the film to be processed. These adjustable members are then connected to pairs of aligned pins spaced longitudinally of the chains, both to support the film and to retain the latter in a stretched or taut relation during its passage through the processing solution. A plurality of such hangers may be attached successively to the chains so that a large number of films may be moved continuously through the machine, the different films being, of course, positioned throughout the various tanks. The film hangers are adapted to be used, with slight modification, with either cut film or roll film.

The present invention has as its principal object the provision of a new and improved film hanger for use with moving chains.

A further object of the invention is the provision of a hanger of this type which is adapted for use with cut or roll film.

A still further object of the invention is the provision of a hanger which may be easily and quickly connected to or detached from the movable drive member or chains.

Yet another object of the invention is the provision of a film hanger which is so constructed that the attaching of the hanger to the drive means serves also to stretch or tension the film on the hanger.

Another object of the invention is the provision of a hanger which is simple, comprises few parts of rugged construction, inexpensive to manufacture, easy to use, and highly effective in its results.

To these and other ends, the invention resides in certain improvements and combinations of parts, all as will be hereinafter more fully described, the novel features being pointed out in the claims at the end of the specification.

In the drawings:

Fig. 1 is a vertical, sectional view through a portion of a film processing machine with which the film hangers of the present invention are to be used, showing the path of the drive or guide chains through the processing tanks;

Fig. 3 is a view similar to Fig. 2, but on a larger scale than the latter, showing the film hanger of the present invention used in connection with roll films;

Fig. 4 is a side view of the chains and hangers illustrated in Fig. 3;

Fig. 5 is a view of the lower hanger rod or member, and a film connecting and tensioning bar used with roll film, with the rod partly in section to show its adjustable feature;

Fig. 6 is a top view of the tensioning bar illustrated in Fig. 5;

Fig. 7 is a view of the upper rod or member of the hanger used in connection with spools of roll film;

Fig. 8 is a vertical sectional view through the tensioning bar illustrated in Figs. 5 and 6, showing the arrangement for connecting and anchoring the ends of roll films to the bar; and Fig. 9 is a sectional view through one end of one of the hanger rods or members, showing the arrangement for connecting the member to a pin of one of the moving chains.

Similar reference numerals throughout the various views indicate the same parts.

Figure 2:
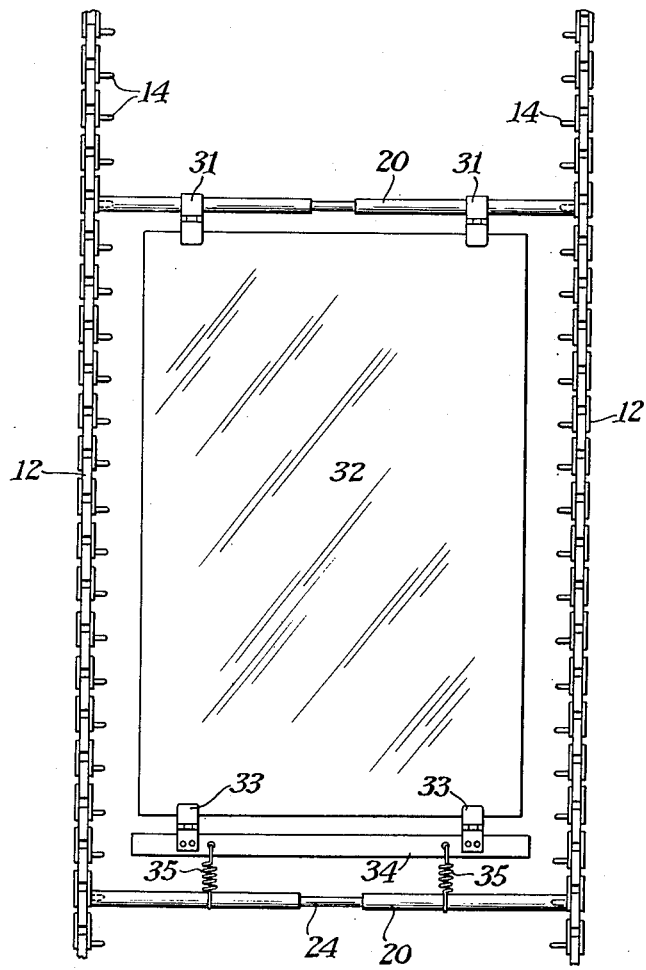
Fig. 2 is a plan view of a pair of drive chains, showing the relation thereto of the film hanger of the present invention, the hanger in this instance being of the type used for cut or sheet film.

Fig. 1 of the drawings shows a portion of a film-processing machine in which a plurality of tanks 11, only two of which are shown, are arranged in aligned relation. The particular solutions in the tanks will depend, of course, on the process being carried out. In processing photographic film, the first tank may contain, for example, a developing solution, while the second tank may contain wash water, and a third tank may contain a fixing solution, etc. Obviously the number of tanks employed depends upon the various treatments which are to be applied to the film while passing therethrough. A pair of endless parallel members 12, in the present instance chains, are guided through the tanks by means of suitable guide rollers 12$^a$, arranged in the manner clearly illustrated in Fig. 1. Any suitable means, not shown, may be used for moving or propelling the chains continuously. After passing through the tanks, the chains 12 are returned over the tops of the tanks to an inclined loading station 13 where the film hangers of the present invention, to be later described, are detachably connected to the pins carried by the chains, as shown in Figs. 2 and 3. After the films have been passed through the tanks, the films finally pass over an inclined unloading station, not shown, but identical to the loading station 13, where the film hangers are removed from the chains. Each chain is provided with a plurality of inwardly projecting pins 14 spaced longitudinal of the chains, the pins on one chain being in alignment with those of the opposite chain as is apparent from an inspection of Figs. 2 and 3. One pin may be positioned at each link, as shown in Fig. 2, or the pins may be placed only on every other link, as illustrated in Fig. 3. In order that the pins of the two chains may be maintained in aligned relation, it is obvious that the chains must be driven at the same speed, but as such driving means forms no part of the present invention, it is not shown.

Fig. 2 shows one modification of the film hanger of the present invention adapted for use with cut or sheet film. The hanger comprises a pair of spaced parallel rods or members 20, each of which is formed of two tubular parts 21 and 22, see Fig. 5. Each part 21 and 22 is of a length slightly less than one-half the distance between the chains 12 so that the adjacent ends 23 of the parts are spaced as shown in Figs. 2 and 5. A rod 24 extends into one of the parts 21 and 22, for example 21, and has one end anchored therein by means of a pin 25. The other end of the rod 24 slides in the member 22 and has a pin 26 which projects into an axially-extending slot 27 formed in part 22 to connect the rod 24 thereto, yet permitting relative axial movement between part 22 and rod 24. A coiled spring 28 is positioned in member 22 and has one end anchored therein, as by a pin 29, while the other end abuts the end 30 of rod 24 and tends to urge the member 22 to the right, as viewed in Fig. 5 to adjust the length of the rod 20 to a length slightly greater than the distance between chains 12, for a purpose to be later described.

Thus, each member 20 is formed of a pair of aligned, axially adjustable parts. The internal diameter of the tubular parts 21 and 22 is such as to receive snugly a pin 14 as clearly illustrated in Fig. 9. The upper rod 20, Fig. 2, is preferably provided with a pair of film clips 31 adapted to engage and hold one end of a film sheet 32, the other end of which may be connected directly to the lower rod 20. However, in order to compensate for the variations in the chains, as well as the film, and also to stretch or tension the latter, the lower end of the sheet is not connected directly to the lower member 20. On the contrary, the lower end of the film sheet 32 preferably is held by clips 33 mounted on an intermediate or auxiliary bar 34 positioned between the lower end of the film and the lower rod 20 and connected to the latter by means of springs or other yieldable or resilient members 35 to hold the film in a supported and stretched relation between the two rods, as clearly illustrated in Fig. 2.

Thus, the film strip is connected to the hanger by means of clips 31 and 33 as shown in Fig. 2. The members 21 and 22 of one of the rods 30 are pressed towards each other, against the action of the spring 28 so that the rod 20 may be shortened for insertion between the chains. The shortened rod is then brought into adjacent relation with a pair of aligned pins 14 on the opposite chain. The shortened rod 20 is then released so as to allow the parts 21 and 22 to move axially under the action of the tensioned spring 28 and into engaging and holding relation with the pins 14, as illustrated in Fig. 9, to connect the rod detachably to the chains. The other rod 20 is then grasped and shortened in a like manner. In addition, the other rod is pulled away from the connected rod to stretch or tension sheet 32, whereupon the other rod 20 is then connected to a second pair of pins 14 spaced longitudinally along the chains 12 from the first or connected rod 20. The hanger is now completely connected to the chains, as shown in Fig. 2, with a film sheet 32 supported by the hanger and arranged in a stretched or taut relation. As the chains move through the processing tanks, each hanger, with its attached sheet 32, moves as a unit therewith to process the film, as is deemed apparent.

In addition to supporting and tensioning sheet films 32 for processing, the film hanger of the present invention may, with a slight modification, also be used to process a plurality of roll films. The embodiment shown in Fig. 3 illustrates the hanger of the present invention used in connection with a plurality of roll films 38 each of which has one end anchored to a film spool 39, which is provided with an axial opening, not shown. As the film spools and the film-anchoring means form no part of the present invention, details thereof are not illustrated or described.

In this embodiment, the lower rod of the hanger is identical to that used in the modification illustrated in Fig. 2, and accordingly is designated by the same numeral. However, in order to support a plurality of film spools 39, the upper rod 40 preferably is a one-piece tubular member at least over the portion thereof engaged by the film spools. The latter are mounted on the rod 40 by passing the latter through the axial openings in the spools to support the latter in aligned relation on the rod 40, as clearly illustrated in Fig. 3. A pair of collars 41 and 42 serve to position the spools on the rod, one of these collars being in fixed position while the latter is removable to permit mounting and removal of the spools. A set screw 43 serves to retain the adjustable collar in position on the rod 40. To provide the axial adjustment necessary to connect the rod 40 detachably to a pair of aligned pins 14 of the chains 12, the tubular member 40 has mounted on one end thereof a spring 44 one end of which is anchored in the member 40 in any suitable well known manner. The other end of the spring 44 engages an end 45 of a rod member 46 slidably positioned in rod 40 and movable axially relative thereto. The outer end of the rod 46 is provided with an enlarged portion 47 which has substantially the same outer diameter as the outer surface of rod 40 as is apparent from an inspection of Fig. 7. The portion 47 is formed with an axial opening 48 adapted to receive one of the pins 14, as will be later described.

After the spools 39 have been mounted on rod 40, the strips 38 are drawn out as shown in Fig. 3, and have the ends 51 thereof secured to an auxiliary bar 52 spaced from, but connected to, the lower rod 20 by means of springs 53. The bar 52 is provided with a plurality of open slots or recesses 54 in which the ends 51 of the film strips 38 are positioned, as best shown in Fig. 8. Each slot 54 has mounted therein an upstanding pin or lug 55 adapted to extend through a registering hole or aperture 56 formed in the end 51 of the film strip positioned therein, as shown in Fig. 9, to connect each strip separately and releasably to the bar 52. A retaining strip 57 is hinged at 58 to one end of bar 52 and is adapted to overlie the slots 54 to close the latter. After the strips 38 have been connected to pins 55, the strip 57 is moved to its closed or solid line position shown in Fig. 6, to close the slots 54 so as to prevent the ends 51 of the strips 38 from becoming detached from pins 55. The latter are preferably of a length greater than the thickness of bar 52 and project through registering apertures 59 formed in strip 57. After the latter has been moved to its lowered or operative position, a clip 60 slidable on a bar 52, is moved over the free end 61 of the strip 57 to retain the latter releasably in slot-closing position. When the strips 38 are to be discontinued, the clip 60 is slid in the opposite direction to release strip 57. The latter is then swung about its hinge 58 to uncover slots 54 to permit removal of the strip ends 51 from the pins 55, as is deemed apparent.

After the spools 39 have been mounted on the upper rod 40 and the film secured in place on bar 52, the hanger is ready for attaching to the chains. To secure this result the rod 46 is slid inwardly of the rod 40 to tension spring 44. The rod 40 with its slidable portion 46 is then brought into alignment with a pair of pins 14 on the chains. Upon release of the portion 46, the latter and the rod 40 engage a pair of pins on the chains to connect the rod 40 thereto. The lower rod 20 is then pulled away from rod 40 to stretch or tension the film strips 38, whereupon the lower rod 20 is then connected to a second pair of pins, in the manner above described, to connect the roll-film hanger to the chains in the manner illustrated in Fig. 3. The film strips 38 then pass through the processing tanks and are supported in stretched relation between the rods connected to the chains. After processing the hanger is removed from the chains and the film strips 38 rewound back on the spools 39, and the latter, with the wound strips, are then disconnected from the rod 40.

Thus, the present invention provides a new and improved film hanger construction adapted for use with either sheet or roll films secured to film spools. The film or films may be easily and quickly attached to the hanger, and the latter, in turn, is readily mounted on the chains to support the sheet in a stretched relation during its passage through the processing tanks. The hanger of the present invention is simple in structure, comprises few parts of rugged construction, easy to manipulate, and highly effective in use.

While certain embodiments of the invention have been disclosed, it is understood that the inventive idea may be carried out in a number of ways. This application is, therefore, not to be limited to the precise details disclosed, but is intended to cover all variations and modifications thereof falling within the scope of the appended claims.

What I claim and desire to secure by Letters Patent of the United States is:

1. In a film-processing machine having a processing tank, the combination with a pair of spaced endless chains movable through said tank and formed with pairs of aligned inwardly extending pins, of a film hanger comprising a pair of separate rods spaced longitudinally of said chains, one of said rods being adapted to support a plurality of film spools each of which has one end of a film strip anchored thereto, a bar spaced longitudinally but arranged parallel to said one rod, means on said bar for connecting the free ends of the film strip thereto, means to connect said bar yieldably to said other rod, and means to connect said rods to pairs of said pins to support said strips in a tensioned relation between said rods for movement through said tank.

2. In a film-processing machine having a processing tank, the combination with a pair of spaced endless chains movable through said tank and formed with pairs of aligned inwardly extending pins, of a film hanger comprising a pair of separate rods spaced longitudinally of said chains, one of said rods being adapted to support a plurality of film spools each of which has one end of a film strip anchored thereto, a bar spaced longitudinally but arranged parallel to said one rod, said bar having a plurality of lugs adapted to extend through registering apertures formed in said strips to connect the latter to said bar, means to connect said bar yieldably to said other rod, and means to connect said rods to pairs of said pins to support said strips in a tensioned relation between said rods for movement through said tank.

3. In a film-processing machine having a processing tank, the combination with a pair of spaced endless chains movable through said tank and formed with pairs of aligned inwardly extending pins, of a film hanger comprising a pair of separate rods spaced longitudinally of said chains, one of said rods being adapted to support a plurality of film spools each of which has one end of a film strip anchored thereto, a bar spaced longitudinally but arranged parallel to said one rod, said bar having a plurality of open end slots therein arranged in alignment with and adapted to receive separately said strips, a lug positioned in each of said slots and adapted to extend through a registering aperture formed in a strip positioned therein to connect said strips to said bar, means to close said slots to retain said strips therein and on said lugs, means yieldably connecting said bar to said other rod, and means to connect said rods to pairs of said pins to support said strips in a tensioned relation between said rods for movement therewith through said tank.

4. For use in a film-processing machine having developing tanks and a pair of parallel chains carrying oppositely located inwardly projecting pins, a film hanger comprising a pair of rods each of which is formed of telescoping members normally spring-pressed apart, a socket on each end of said rods engageable with the pins carried by the chains, and means for connecting opposite ends of a film to said rods to be supported thereby during the passage through said tanks.

5. For use in a film-processing machine having developing tanks and a pair of parallel chains carrying oppositely located inwardly projecting pins, a film hanger comprising a pair of rods each of which is formed of telescoping members normally spring-pressed apart, a socket on each end of said rods engageable with the pins carried by the chains, means for connecting one end of a film to one of said telescoping rods, a rigid rod of less length than the telescoping rods, means to attach the other end of said film to said rigid rod, and spring means for connecting said rigid rod to the other of said telescoping rods to support said film in a stretched relation between said telescoping rods.

HAROLD L. FITCH.

REFERENCES CITED

The following references are of record in the file of this patent:

FOREIGN PATENTS

| Number | Country | Date |
|---|---|---|
| 357,597 | Great Britain | Sept. 28, 1931 |
| 874,448 | France | May 4, 1942 |
| 885,646 | France | June 7, 1943 |